Nov. 17, 1925.  
F. W. LORD  
1,561,871

BUTTERMILK FEEDER FOR CHICKS

Filed April 29, 1925

INVENTOR  
Fred W. Lord  
BY  
ATTORNEY

Patented Nov. 17, 1925.

1,561,871

UNITED STATES PATENT OFFICE.

FRED W. LORD, OF TIPTON, INDIANA, ASSIGNOR TO THE OAKES MANUFACTURING COMPANY, OF TIPTON, INDIANA, A CORPORATION OF INDIANA.

BUTTERMILK FEEDER FOR CHICKS.

Application filed April 29, 1925. Serial No. 26,742.

*To all whom it may concern:*

Be it known that I, FRED W. LORD, a citizen of the United States, residing at Tipton, in the county of Tipton and State of Indiana, have invented certain new and useful Improvements in Buttermilk Feeders for Chicks, of which the following is a specification.

My invention relates to a feeding device for the purpose of dispensing liquid food, such as water, milk or buttermilk, or fine dry feed, such as grain, etc., for feeding poultry, and has for its object to provide a device of this character which is durable, simple, and inexpensive in its construction, efficient in use and of few parts, whereby it is easily kept clean and is not apt to get out of order, all as will be hereinafter more fully described and claimed.

Figure 1:
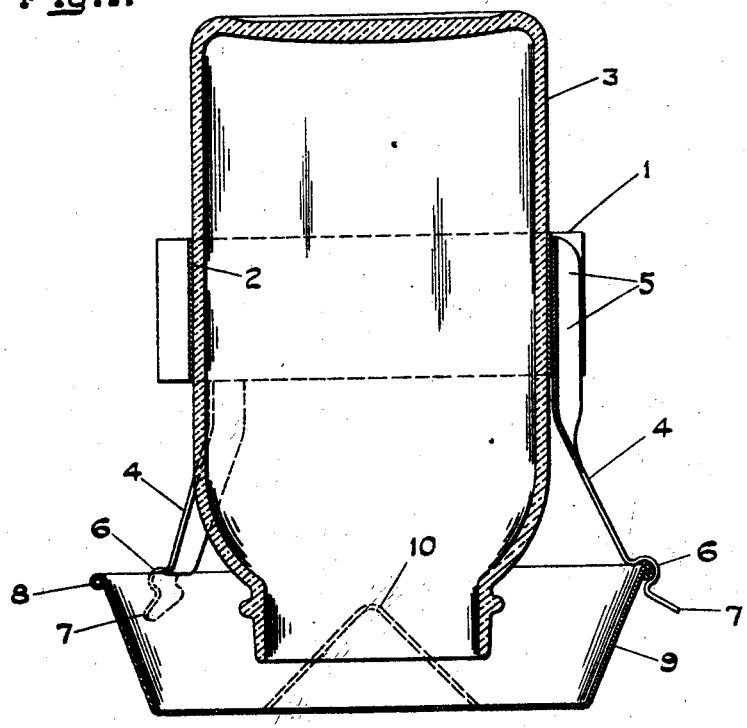
Figure 2:
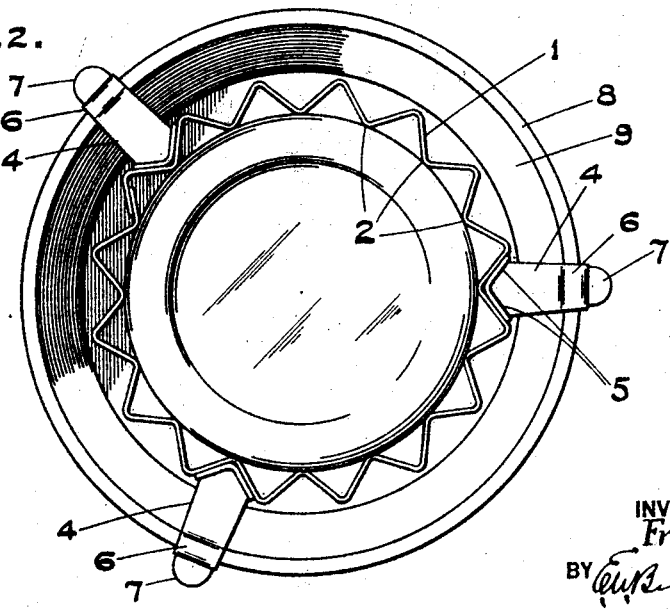

Referring to the accompanying drawings, which are made a part hereof and on which similar reference characters indicate similar parts, Figure 1 is a vertical section through my device, and Figure 2 a plan view.

In the drawings, reference character 1 indicates a resilient, corrugated metal ring or band corrugated in such a manner that the inner lobes 2 bear against and exert a slight pressure on the side wall of a cylindrical jar or receptacle 3. The band or ring 1 is provided with resilient legs 4 extending downwardly and outwardly and are welded or otherwise appropriately secured to ring 1 at points indicated by reference characters 5. The lower extremities of legs 4 are made claw-shape, as shown at 6, and are provided with tabs 7. The loop portions 6 of legs 4 spring over and clamp the rim 8 of a pan 9. The receptacle 3 may be a fruit jar of usual type, or of any like character, and the pan 9 is likewise of the usual household variety.

The pressure exerted by the ring 1 against the jar 3 is such that it will hold the filled jar in any vertical position desired at the same time permitting the jar to be removed or adjusted vertically without undue effort. Such adjustment provides for regulating the flow of the feed into the pan 9.

The ring or band 1 with its legs 4 and jar 3 may be easily attached to or detached from pan 9, the attaching being secured by simply forcing the tabs 7 down over the rim 8 until said rim 8 is engaged within the claws 6. The tabs 7 provide a ready means for disengaging one or more of the legs 4 from the rim 8 of the pan 9.

When it is desired to fill the receptacle the device is inverted and when in this position pan 9 may be removed, the feed poured into the receptacle, the pan restored, and the device set aright for use. The adjustment is thus undisturbed after the desired adjustment for feeding is once obtained.

I do not restrict my invention to the details of construction shown, which may be varied within the scope of the claim.

For the purpose of distributing the dry feed, so that all of it can be readily reached, the pan 9 may be provided in its center with a cone 10, as shown by dotted lines in the drawing.

Having thus fully described my said invention, what I claim as new and desire to secure by Letters Patent, is:

A feeding device comprising a resilient corrugated band, a receptacle clamped thereon, a pan, and means for supporting said ring member carrying the receptacle in adjusted relation to said pan.

In witness whereof, I have hereunto set my hand at Tipton, Indiana, this 20th day of April, A. D. nineteen hundred and twenty-five.

FRED W. LORD.